United States Patent
Terashima

(10) Patent No.: US 10,174,796 B2
(45) Date of Patent: Jan. 8, 2019

(54) CLUTCH CONNECTION/DISCONNECTION DEVICE FOR DUAL CLUTCH TRANSMISSION

(71) Applicant: ISUZU MOTORS LIMITED, Tokyo (JP)

(72) Inventor: Koji Terashima, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 108 days.

(21) Appl. No.: 15/515,556

(22) PCT Filed: Sep. 29, 2015

(86) PCT No.: PCT/JP2015/077596
§ 371 (c)(1),
(2) Date: Mar. 29, 2017

(87) PCT Pub. No.: WO2016/052553
PCT Pub. Date: Apr. 7, 2016

(65) Prior Publication Data
US 2017/0227073 A1   Aug. 10, 2017

(30) Foreign Application Priority Data

Sep. 29, 2014   (JP) ................................. 2014-199056

(51) Int. Cl.
*F16D 48/02*   (2006.01)
*F16H 59/04*   (2006.01)
*B60K 23/02*   (2006.01)

(52) U.S. Cl.
CPC .......... *F16D 48/0206* (2013.01); *B60K 23/02* (2013.01); *F16H 59/04* (2013.01);
(Continued)

(58) Field of Classification Search
None
See application file for complete search history.

(56) References Cited

U.S. PATENT DOCUMENTS 3,774,460 A * 11/1973 Browning ............. B60K 17/28
192/48.7
4,513,850 A    4/1985 Plate
(Continued)

FOREIGN PATENT DOCUMENTS

CN   1526580 A   9/2004
CN   1842664 A   10/2006
(Continued)

OTHER PUBLICATIONS

Office Action for CN App No. 201580052727.7 dated May 23, 2018, 10 pgs.
(Continued)

*Primary Examiner* — Colby M Hansen
(74) *Attorney, Agent, or Firm* — Procopio, Cory, Hargreaves & Savitch LLP

(57) ABSTRACT

A clutch-side transmission circuit transmits, from a clutch pedal, a restoring action of the depressed clutch pedal. A switching device connects a first clutch-side hydraulic circuit to the pedal-side hydraulic circuit when a shift lever SL is tilted forwards and connects a second clutch-side hydraulic circuit to the pedal-side hydraulic circuit when the shift lever SL is tilted rearwards. A first clutch is engaged in response to the restoring action of the clutch pedal being transmitted from the first clutch-side transmission circuit. A second clutch is engaged in response to the restoring action of the clutch pedal being transmitted from the second clutch-side transmission circuit.

1 Claim, 13 Drawing Sheets

(52) U.S. Cl.
CPC ............... *F16D 2048/023* (2013.01); *F16D 2500/1082* (2013.01); *F16D 2500/10412* (2013.01); *F16D 2500/31413* (2013.01); *F16D 2500/31466* (2013.01); *F16D 2500/5118* (2013.01); *F16H 2200/0052* (2013.01); *F16H 2200/0086* (2013.01)

(56) References Cited

U.S. PATENT DOCUMENTS

| | | | | |
|---|---|---|---|---|
| 4,565,108 | A | * | 1/1986 | Makita ............... F16H 3/12 192/21.5 |
| 4,632,234 | A | | 12/1986 | Bardoll et al. |
| 5,094,329 | A | * | 3/1992 | Maguire ............. B60K 17/02 192/48.1 |
| 5,791,189 | A | * | 8/1998 | Newbigging ......... F16H 61/70 74/335 |
| 6,378,675 | B1 | * | 4/2002 | Kundermann ......... F16D 21/06 192/3.27 |
| 6,427,550 | B1 | | 8/2002 | Bowen |
| 8,820,185 | B2 | * | 9/2014 | Czoykowski ....... F16D 48/0206 192/3.58 |
| 2002/0152823 | A1 | | 10/2002 | Wild et al. |
| 2004/0231943 | A1 | | 11/2004 | Berger et al. |
| 2005/0043141 | A1 | | 2/2005 | Neuner |
| 2006/0174722 | A1 | | 8/2006 | Terai |
| 2012/0090416 | A1 | * | 4/2012 | Kao ................... F16D 48/0206 74/333 |
| 2014/0095033 | A1 | | 4/2014 | Kojima et al. |

FOREIGN PATENT DOCUMENTS

| | | |
|---|---|---|
| CN | 201062650 Y | 5/2008 |
| DE | 3414107 A1 | 10/1985 |
| EP | 0144737 A2 | 6/1985 |
| JP | 2007-032702 A | 2/2007 |
| JP | 2013-137077 A | 7/2013 |
| JP | 2013-204791 A | 10/2013 |
| JP | 2014-070687 A | 4/2014 |

OTHER PUBLICATIONS

Extended European Search Report for EP App No. 15847474.2 dated Apr. 30, 2018, 9 pgs.
International Search Report and Written Opinion for PCT App No. PCT/JP2015/077596 dated Dec. 15, 2015, 11 pgs.

* cited by examiner

CLUTCH CONNECTION/DISCONNECTION DEVICE FOR DUAL CLUTCH TRANSMISSION

CROSS-REFERENCE TO RELATED APPLICATIONS

This application is a U.S. National Stage entry of PCT Application No. PCT/JP2015/077596, filed on Sep. 29, 2015, which claims priority to Japanese Patent Application No. 2014-199056, filed Sep. 29, 2014, the contents of which are incorporated herein by reference.

TECHNICAL FIELD

The present invention relates to a clutch connection/disconnection device for a dual clutch transmission mounted on a vehicle.

BACKGROUND ART

Patent Literature 1 describes a transmission with an auxiliary transmission mechanism which includes a splitter-type auxiliary transmission mechanism disposed on an input side and a main transmission mechanism disposed on an output side. In the splitter-type auxiliary transmission mechanism, gears are changed by using of a synchronizer, and a power transmission path of the main transmission mechanism is switched selectively between a high-gear side path and a low-gear side path in response to the gear change.

PRIOR ART LITERATURE

Patent Literature

Patent Literature 1: JP-A-2013-137077

SUMMARY OF THE INVENTION

Problem that the Invention is to Solve

Gears are changed frequently in response to slight changes in gradient of a road surface, because a gear ratio of the input-side auxiliary transmission mechanism is small. Due to this, in the case of the splitter-type auxiliary transmission mechanism using the synchronizer, wear and degradation of the synchronizer tends to progress earlier and lead a possibility of a reduction in service life.

In order to eliminate the drawback like this, it is considered that a dual clutch is used in place of the synchronizer. When a dual clutch is engaged and disengaged in response to the operation of a driver, an operation of switching clutches to be engaged or disengaged that does not exist in a single-clutch transmission becomes necessary. Then, in case the operation of switching the clutches to be engaged or disengaged is set separately, a special operation by the driver is added and leads complex driving operations.

The present invention has been made in view of the situations described above, and an object is to provide a clutch connection/disconnection device for a dual clutch transmission which can switch clutches to be engaged or disengaged without leading complex driving operations.

Means for Solving the Problem

To achieve the object above, according to the present invention, there is provided a clutch connection/disconnection device for a dual clutch transmission which includes a clutch pedal, a biasing device, a pedal-side transmission circuit, a first clutch-side transmission circuit, a second clutch-side transmission circuit, and a switching device.

The dual clutch transmission includes a dual clutch having a first clutch and a second clutch, the dual clutch is provided on an input side of a main transmission mechanism. A power transmission path of the main transmission mechanism is switched to a high-gear side path in response to the first clutch being engaged and to a low-gear side path in response to the second clutch being engaged. A shift lever can be moved to an arbitrary shift position among high-gear side shift positions on one side and low-gear side shift positions on the other side. The dual clutch transmission executes a gear change in response to the movement of the shift lever.

The clutch pedal is depressed to move from a predetermined initial position. The biasing device biases the clutch pedal to the initial position and returns the clutch pedal to the initial position in response to releasing from the depressed state.

The clutch-side transmission circuit transmits a restoring action, in which the clutch pedal being depressed is returned to the initial position by the biasing device, from the clutch pedal. The first clutch-side transmission circuit is a circuit for transmitting the restoring action of the clutch pedal to the first clutch. The second clutch-side transmission circuit is a circuit for transmitting the restoring action of the clutch pedal to the second clutch.

The switching device connects the first clutch-side transmission circuit to the pedal-side transmission circuit when the shift lever is moved to the one side and connects the second clutch-side transmission circuit to the pedal-side transmission circuit when the shift lever is moved to the other side. The first clutch is engaged in response to the restoring action of the clutch pedal being transmitted from the first clutch-side transmission circuit. The second clutch is engaged in response to the restoring action of the clutch pedal being transmitted from the second clutch-side transmission circuit.

According to the configuration described above, when the shift lever is operated to be moved to the one side (for example, to the front), the switching device connects the first clutch-side transmission circuit to the pedal-side transmission circuit. When the first clutch-side transmission circuit is connected to the pedal-side transmission circuit, the restoring action of the depressed clutch pedal is transmitted to the first clutch by way of the pedal-side transmission circuit and the first clutch-side transmission circuit. Thus, the first clutch is engaged.

In addition, when the shift lever is operated to be moved to the other side (for example, to the rear), the switching device connects the second clutch-side transmission circuit to the pedal-side transmission circuit. When the second clutch-side transmission circuit is connected to the pedal-side transmission circuit, the restoring action of the depressed clutch pedal is transmitted to the second clutch by way of the pedal-side transmission circuit and the second clutch-side transmission circuit. Thus, the second clutch is engaged.

In this way, since the clutches are selected in response to whether toward one side or the other side the shift lever being moved, no special operation is necessary to switch the clutches to be engaged or disengaged, and similarly in case of the single clutch transmission, it is possible to switch the clutches to be engaged or disengaged by operating the clutch pedal and the shift lever.

Advantageous Effect of the Invention

According to the clutch connection/disconnection device for a dual clutch transmission of the present invention, it is possible to switch the clutches to be engaged or disengaged without leading complex driving operations.

MODE FOR CARRYING OUT THE INVENTION

Hereinafter, a first embodiment of the present invention will be described in detail by reference to the drawings.

Figure 1:
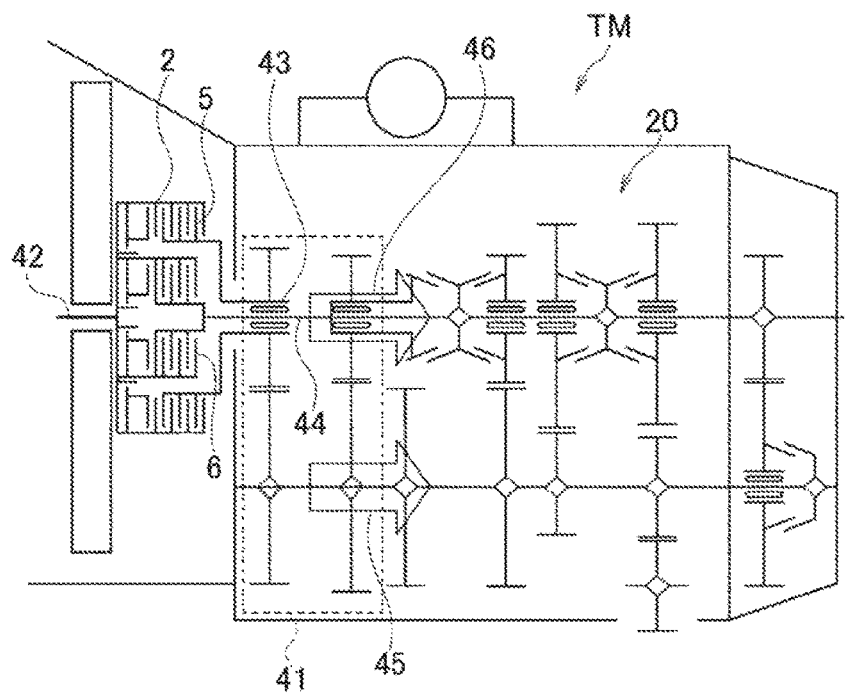
FIG. 1 is a schematic diagram showing an example of a dual clutch transmission to which a clutch connection/disconnection device of the present invention is applied.

As shown in FIG. 1, a dual clutch manual transmission (a dual clutch transmission) TM includes a main transmission mechanism 20, a splitter mechanism 41 which is provided on an input side of the main transmission mechanism 20, and a dual clutch 2 which is provided on an input side of the splitter mechanism 41 and changes gears in response to an operation of a shift lever SL (refer to FIG. 2) of a shift operating device 50. The dual clutch 2 has a first clutch 5 and a second clutch 6, and the main transmission mechanism 20 has a high-gear side path 45 and a low-gear side path 46 as power transmission paths. When the first clutch 5 is engaged, power of an input shaft 42 which is connected to an engine (whose illustration is omitted) is inputted from the first clutch 5 into a first shaft 43 of the splitter mechanism 41 and is then transmitted to the high-gear side path 45. When the second clutch 6 is engaged, the power of the input shaft 42 is inputted from the second clutch 6 into a second shaft 44 of the splitter mechanism 41 and is then transmitted to the high-gear side path 45. Namely, the power transmission path of the main transmission mechanism 20 is switched to the high-gear side path 45 in response to the first clutch 5 being engaged and to the low-gear side path 46 in response to the second clutch 6 being engaged.

Figure 2:
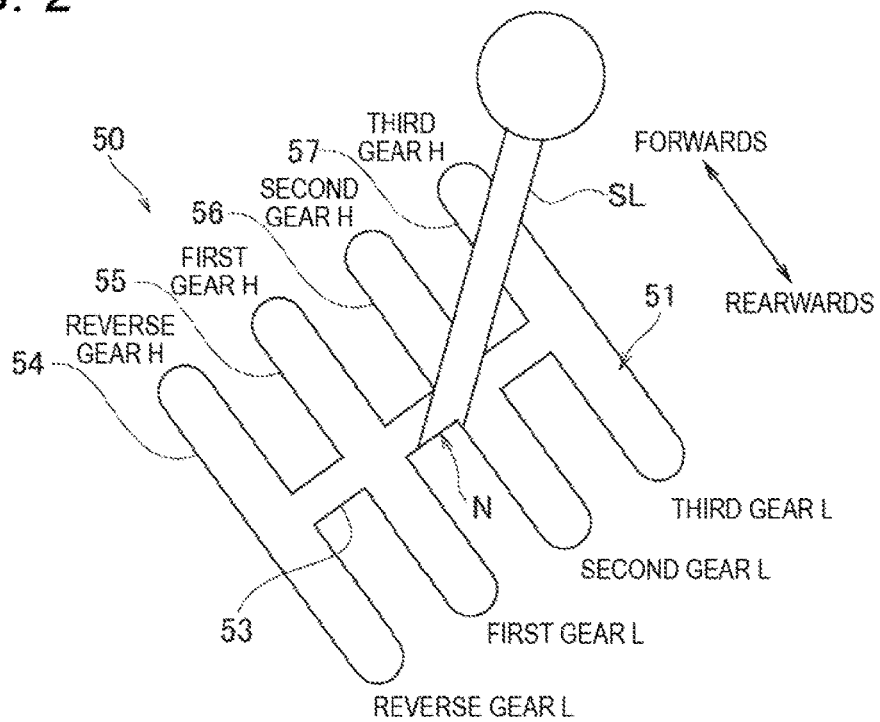
FIG. 2 is a perspective view showing schematically an example of a shift operating device.

As shown in FIG. 2, the shift operating device 50 includes a plurality of H-shaped gates 51 and the shift lever SL which can be moved in the H-shaped gates 51. A selecting path 53 is provided in a selecting direction (a side-to-side direction of a vehicle) of the H-shaped gates 51, and a neutral position N is set in a center of the selecting path 53, the neutral position N corresponding to a neutral mode. Four shifting paths 54 to 57 are provided in a shifting direction (a fore-and-aft direction) of the H-shaped gates 51 so as to intersect the selecting path 53 at right angles. Shift positions are provided at end portions of the four shifting paths 54 to 57, and the shifting positions correspond to six forward gears (a first gear L to a third gear H) and two reverse gears (a reverse gear L, a reverse gear H). Each of the front side (one side) end portions of each of the shifting paths 54 to 57 corresponds to the high-gear side shift positions (the reverse gear H, the first gear H, the second gear H, the third gear H), and each of the rear side (the other side) end portions corresponds to the low-gear side shift positions (the reverse gear L, the first gear L, the second gear L, the third gear L). The shift lever SL can be moved to an arbitrary shift position among the high-gear shift positions and the low-gear shift positions, and the dual clutch transmission TM changes gears in response to a movement of the shift lever SL. For example, when the shift lever SL is moved to the high-gear shift position, power is transmitted to the high-gear side path 45 of the main transmission mechanism 20 (refer to FIG. 1), and a gear combination corresponding to the shift position is selected in the high-gear side path 45. In addition, when the shift lever SL is moved to the low-gear shift position, power is transmitted to the low-gear side path 46, and a gear combination corresponding to the shift position is selected in the low-gear side path 46. A detailed description of the gear combinations at each of the shift positions will be omitted.

Figure 3:
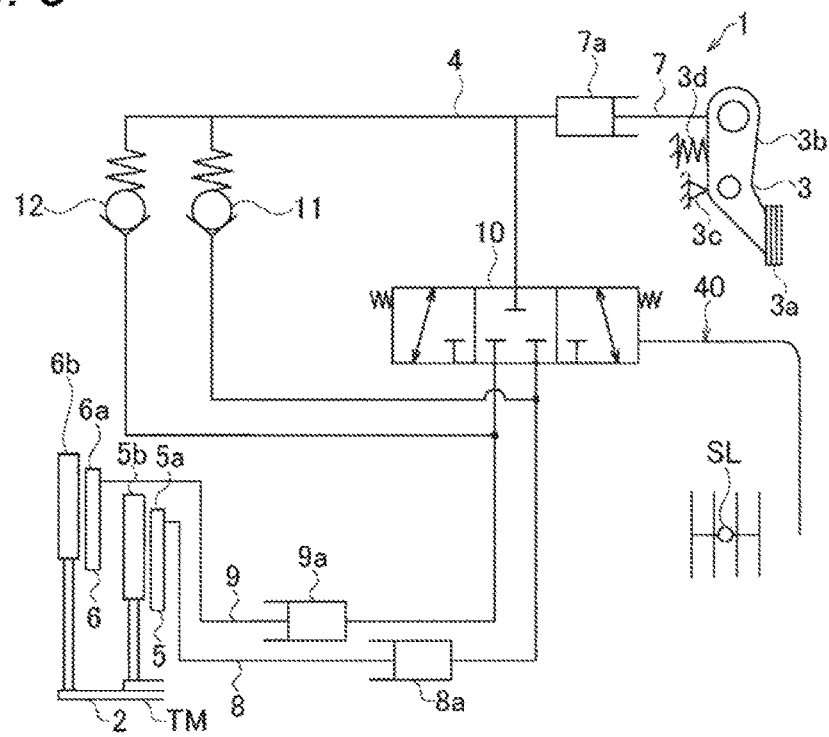
FIG. 3 is a schematic diagram showing a clutch connection/disconnection device according to a first embodiment of the present invention.

As shown in FIG. 3, a clutch connection/disconnection device 1 includes a clutch pedal mechanism 3 and a hydraulic circuit 4.

The first clutch 5 of the dual clutch 2 includes a first pressure plate 5a and a first clutch disc 5b. The first pressure plate 5a is fixed to a crankshaft (whose illustration is omitted) of the engine and rotates together with the crankshaft. The first clutch disc 5b is fixed to an input end side of a first input shaft (whose illustration is omitted) and rotates together with the first input shaft. The first clutch 5 is coupled to the hydraulic circuit 4, and the first pressure plate 5a is pushed to move towards the first clutch disc 5b and is pressed to contact with the first clutch disc 5b. This allows the power of the engine to be transmitted to the first input shaft. On the other hand, the first clutch 5 is coupled to the hydraulic circuit 4, and the first pressure plate 5a is pulled to move away from the first clutch disc 5b and is disengaged from the first clutch disc 5b.

The second clutch 6 includes a second pressure plate 6a and a second clutch disc 6b. The second pressure plate 6a is fixed to the crankshaft (whose illustration is omitted) of the engine and rotates together with the crankshaft. The second clutch disc 6b is fixed to an input end side of a second input shaft (whose illustration is omitted) and rotates together with the second input shaft. The second clutch 6 is coupled to the hydraulic circuit 4, and the second pressure plate 6a is pushed to move towards the second clutch disc 6b and is pressed to contact with the second clutch disc 6b. This allows the power of the engine to be transmitted to the second input shaft. On the other hand, the second clutch 6 is coupled to the hydraulic circuit 4, and the second pressure plate 6a is pulled to move away from the second clutch disc 6b and is disengaged from the second clutch disc 6b.

The clutch pedal mechanism 3 is a mechanism for engaging and disengaging the first clutch 5 and the second clutch 6 and is connected to the hydraulic circuit 4. The clutch pedal mechanism 3 includes a clutch pedal 3a, an arm 3b, an arm support portion 3c and a spring (a biasing device) 3d.

The clutch pedal 3a is fixed to one end of the arm 3b. This clutch pedal 3a is depressed from a predetermined initial position to disengage the first clutch 5 and the second clutch 6. The arm 3b is supported to be rotatable by the arm support portion 3c. The arm 3b is inclined in one direction (in a clockwise direction in Figure) while stretching the spring 3d in response to the clutch pedal 3a being depressed. In addition, the arm 3b is inclined in the other direction (in a counterclockwise direction in Figure), by biasing force produced when the stretched spring 3d restores (shrinks) in response to the depression of the clutch pedal 3a being released, to bring the clutch pedal 3a back to its original position. Namely, the spring 3d biases the clutch pedal 3a to its initial position and returns the clutch pedal 3a to its initial position when the depression is released.

The hydraulic circuit 4 transmits, to the first clutch 5 and the second clutch 6, a depressed action of the clutch pedal 3a and a restoring action in which the depressed clutch pedal 3a is returned by the spring 3d. The hydraulic circuit 4 includes a pedal-side hydraulic circuit (a pedal-side transmission circuit) 7, a first clutch-side hydraulic circuit (a first clutch-side transmission circuit) 8, a second clutch-side hydraulic circuit (a second clutch-side transmission circuit) 9, a switching valve (a switching device) 10 and check valves 11, 12.

The pedal-side hydraulic circuit 7 is connected to the clutch pedal mechanism 3 and makes up a circuit on the side of the clutch pedal mechanism 3. A path of the pedal-side hydraulic circuit 7 is divided into three paths and the three paths are connected to the switching valve 10 and the check valves 11, 12 respectively. The pedal-side hydraulic circuit 7 includes a hydraulic cylinder 7a which is provided on the path before it is divided into the three paths and transmits the depressed action of the clutch pedal 3a and the restoring action of the depressed clutch pedal 3a from the clutch pedal mechanism 3 by the action of the hydraulic cylinder 7a. The hydraulic cylinder 7a is pulled by the depressed action of the clutch pedal 3a and forms flows from the changing valve 10 and the check valves 11, 12 towards the clutch pedal mechanism 3. On the other hand, the hydraulic cylinder 7a is pushed by the restoring action of the depressed clutch pedal 3a to form a flow from the clutch pedal mechanism 3 towards the switching valve 10.

The first clutch-side hydraulic circuit 8 is connected to the first clutch 5 and makes up a circuit on the side of the first clutch 5. A path of the first clutch-side hydraulic circuit 8 is divided into two paths and the two paths are connected to the switching valve 10 and the check valve 11 respectively. The first clutch-side hydraulic circuit 8 includes a hydraulic cylinder 8a which is provided on the path before it is divided into the two paths and transmits the depressed action of the clutch pedal 3a and the restoring action of the depressed clutch pedal 3a to the first clutch 5 by the action of the hydraulic cylinder 8a.

The second clutch-side hydraulic circuit 9 is connected to the second clutch 6 and makes up a circuit on the side of the second clutch 6. A path of the second clutch-side hydraulic circuit 9 is divided into two paths and the two paths are connected to the switching valve 10 and the check valve 12 respectively. The second clutch-side hydraulic circuit 9 includes a hydraulic cylinder 9a which is provided on the path before it is divided into the two paths and transmits the depressed action of the clutch pedal 3a and the restoring action of the depressed clutch pedal 3a to the second clutch 6 by the action of the hydraulic cylinder 9a.

The switching valve 10 has three ports which are situated in three different positions. The switching valve 10 adopts a spool of a closed center type and a spring-centered restoring method. The operating method of the switching valve 10 is manual. Each of the ports of the switching valve 10 is connected to the pedal-side hydraulic circuit 7, the first clutch-side hydraulic circuit 8 or the second clutch-side hydraulic circuit 9. The switching valve 10 disconnects the pedal-side hydraulic circuit 7 from the first clutch-side hydraulic circuit 8 and the second clutch-side hydraulic circuit 9 when the shift lever SL is in the neutral state where the shift lever SL is not tilted forwards or backwards (is moved neither to the front nor to the rear) (refer to FIG. 3). Then, the switching valve 10 connects the first clutch-side hydraulic circuit 8 to the pedal-side hydraulic circuit 7 when the shift lever SL is tilted forwards (is moved to the front) to move the switching valve itself forwards (move leftwards in Figure) (refer to FIG. 4). In addition, the switching valve 10 connects the second clutch-side hydraulic circuit 9 to the pedal-side hydraulic circuit 7 when the shift lever SL is tilted rearwards (is moved to the rear) to move the switching valve itself rearwards (move rightwards in Figure) (refer to FIG. 8).

The switching valve 10 is coupled to the shift lever SL by way of a coupling mechanism 40 which is made up of a link or a wire, the ports of the switching valve 10 are switched over in association with the shift lever SL being tilted in the fore-and-aft direction. The switching valve 10 may be made up of a solenoid valve, and a signal line may be provided in place of the coupling mechanism 40, so that the solenoid valve is switched by a control signal which corresponds to the fore-and-aft tilting of the shift lever SL.

The check valve 11 is connected to both the pedal-side hydraulic circuit 7 and the first clutch-side hydraulic circuit 8 respectively. This check valve 11 permits a flow from the pedal-side hydraulic circuit 7 to the first clutch-side hydraulic circuit 8 but prohibits a flow from the first clutch-side hydraulic circuit 8 to the pedal-side hydraulic circuit 7.

The check valve 12 is connected to both the pedal-side hydraulic circuit 7 and the second clutch-side hydraulic circuit 9 respectively. This check valve 12 permits a flow from the pedal-side hydraulic circuit 7 to the second clutch-side hydraulic circuit 9 but prohibits a flow from the second clutch-side hydraulic circuit 9 to the pedal-side hydraulic circuit 7.

Next, the operation of the clutch connection/disconnection device 1 will be described.

Figure 4:
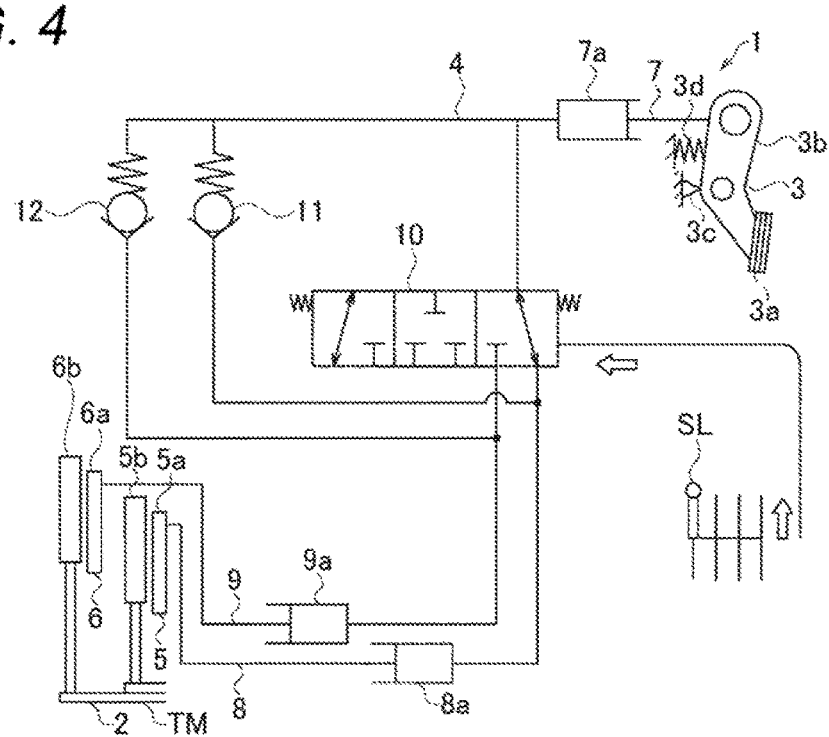
FIG. 4 is a schematic diagram of the first embodiment showing an operation when a shift lever is tilted forwards in a state that a clutch pedal is kept depressed.

As shown in FIG. 4, when the shift lever SL is tilted forwards in a state that the clutch pedal 3a is kept depressed, the switching valve 10 moves forwards (moves leftwards in Figure) to connect the first clutch-side hydraulic circuit 8 to the pedal-side hydraulic circuit 7.

Figure 5:
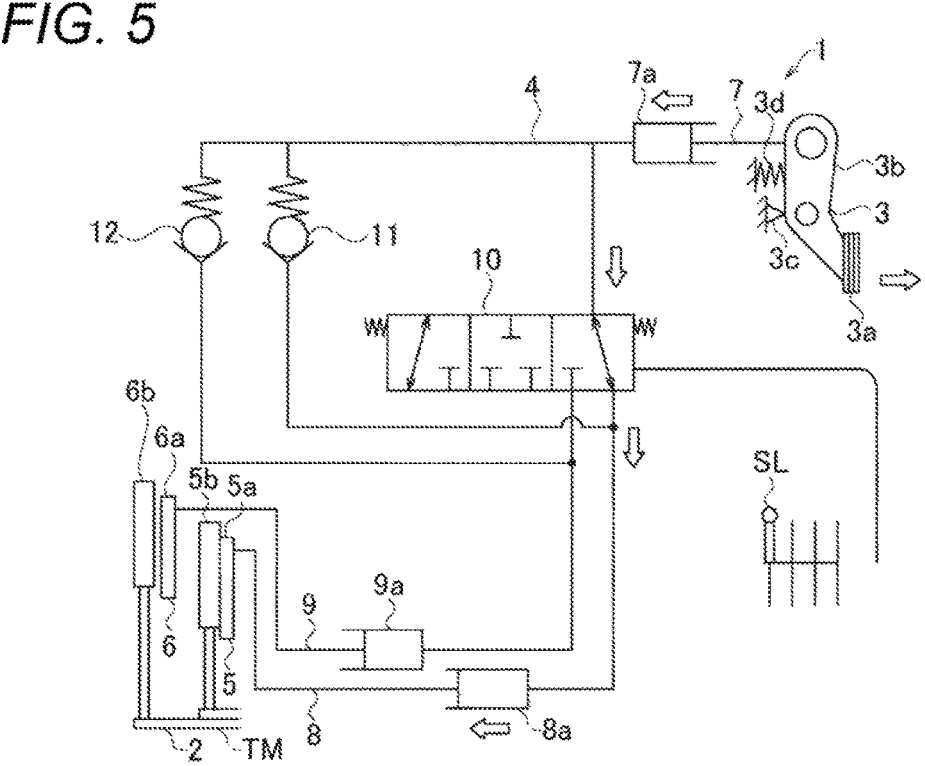
FIG. 5 is a schematic diagram of the first embodiment showing an operation when the first clutch is engaged in response to the clutch pedal being returned in a state that the shift lever is kept tilted forwards.

As shown in FIG. 5, when the clutch pedal 3a is returned in a state that the shift lever SL is kept tilted forwards, the restoring action of the clutch pedal 3a actuates the hydraulic cylinder 7a to pressurize the pedal-side hydraulic circuit 7. This forms a flow from the clutch pedal mechanism 3 to the switching valve 10. Then, a movement of the hydraulic cylinder 7a actuates the hydraulic cylinder 8a to pressurize the first clutch-side hydraulic circuit 8. This forms a flow from the switching valve 10 to the first clutch 5. In addition, the pushing action of the hydraulic cylinder 8a engages the first clutch 5. In this case, the second clutch-side hydraulic circuit 9 is not pressurized and the second clutch 6 is kept disengaged due to functioning the switching valve 10 and the check valve 12.

Figure 6:
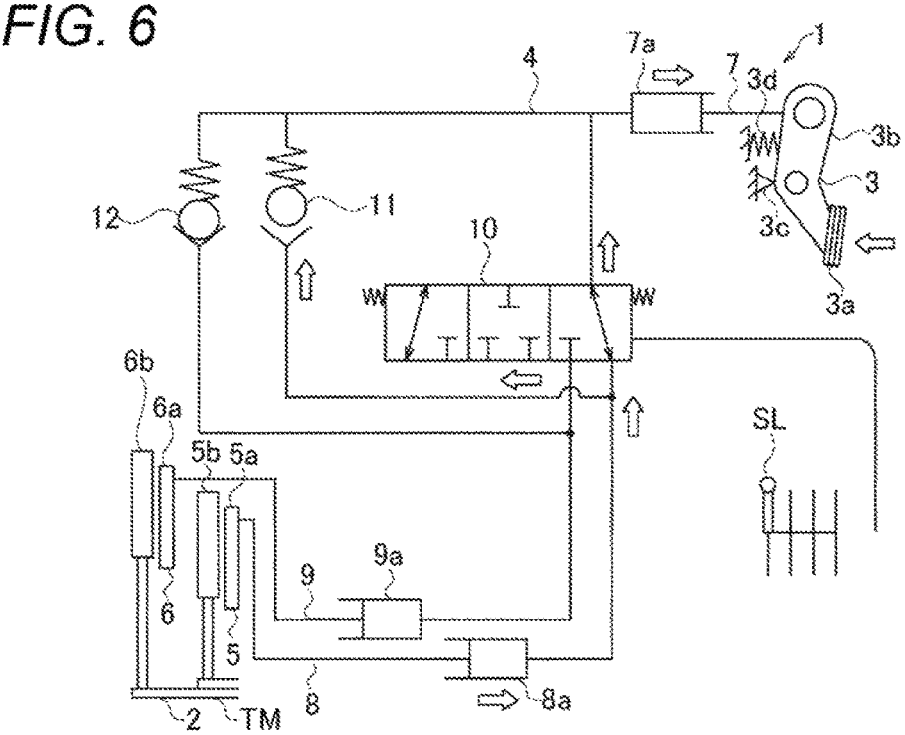
FIG. 6 is a schematic diagram of the first embodiment showing an operation when the clutch pedal is depressed in a state that the first clutch is kept engaged.

As shown in FIG. 6, when the clutch pedal 3a is depressed in a state that the first clutch 5 is kept engaged, the depressing action of the clutch pedal 3a actuates the hydraulic cylinder 7a to depressurize the pedal-side hydraulic circuit 7. This forms flows from the switching valve 10 and the check valve 11 to the clutch pedal mechanism 3. Then, a movement of the hydraulic cylinder 7a actuates the hydraulic cylinder 8a to depressurize the first clutch-side hydraulic circuit 8. This forms flows from the first clutch 5 to the switching valve 10 and the check valve 11. In addition, the pulling action of the hydraulic cylinder 8a disengages the first clutch 5. In this case, the second clutch-side hydraulic circuit 9 is not pressurized and the second clutch 6 is kept disengaged due to the pedal-side hydraulic circuit 7 being depressurized.

Figure 7:
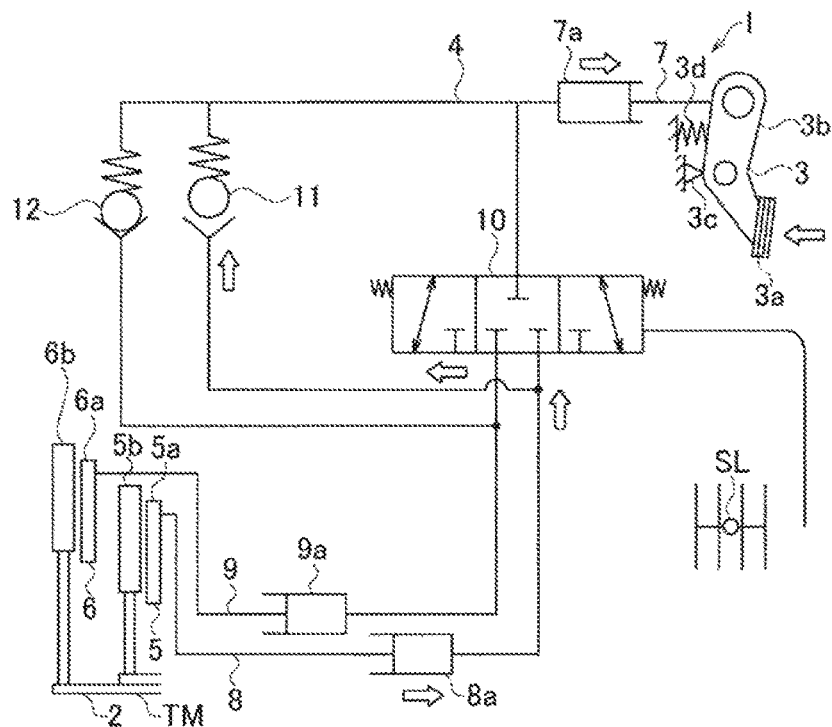
FIG. 7 is a schematic diagram of the first embodiment showing an operation when the clutch pedal is depressed in a state that the shift lever is in a neutral position and the first clutch is kept engaged.

Alternatively, as shown in FIG. 7, when the shift lever SL is returned to the neutral state, the switching valve 10 cuts off the communication between the pedal-side hydraulic circuit 7 and the first clutch-side hydraulic circuit 8 while keeping the pedal-side hydraulic circuit 7 and the second clutch-side hydraulic circuit 9 disconnected. Thereafter, when the clutch pedal 3a is depressed in a state that the first clutch 5 is kept engaged, the depressing action of the clutch pedal 3a actuates the hydraulic cylinder 7a to depressurize the pedal-side hydraulic circuit 7. This forms a flow from the check valve 11 to the clutch pedal mechanism 3. Then, a movement of the hydraulic cylinder 7a actuates the hydraulic cylinder 8a to depressurize the first clutch-side hydraulic circuit 8. This forms a flow from the first clutch 5 to the check valve 11. In addition, the pulling action of the hydraulic cylinder 8a disengages the first clutch 5. In this case, the second clutch-side hydraulic circuit 9 is not pressurized and the second clutch 6 is kept disengaged due to the pedal-side hydraulic circuit 7 being depressurized.

Figure 8:
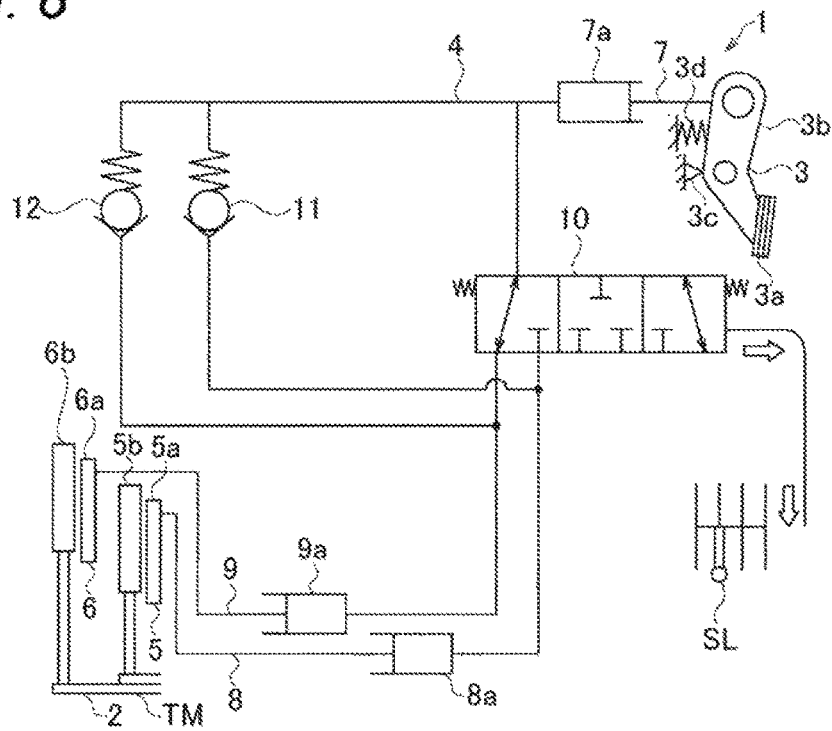
FIG. 8 is a schematic diagram of the first embodiment showing an operation when the shift lever is tilted rearwards in a state that the clutch pedal is kept depressed.

As shown in FIG. 8, when the shift lever SL is tilted rearwards in a state that the clutch pedal 3a is kept depressed, the switching valve 10 moves rearwards (moves rightwards in Figure) to connect the second clutch-side hydraulic circuit 9 to the pedal-side hydraulic circuit 7.

Figure 9:
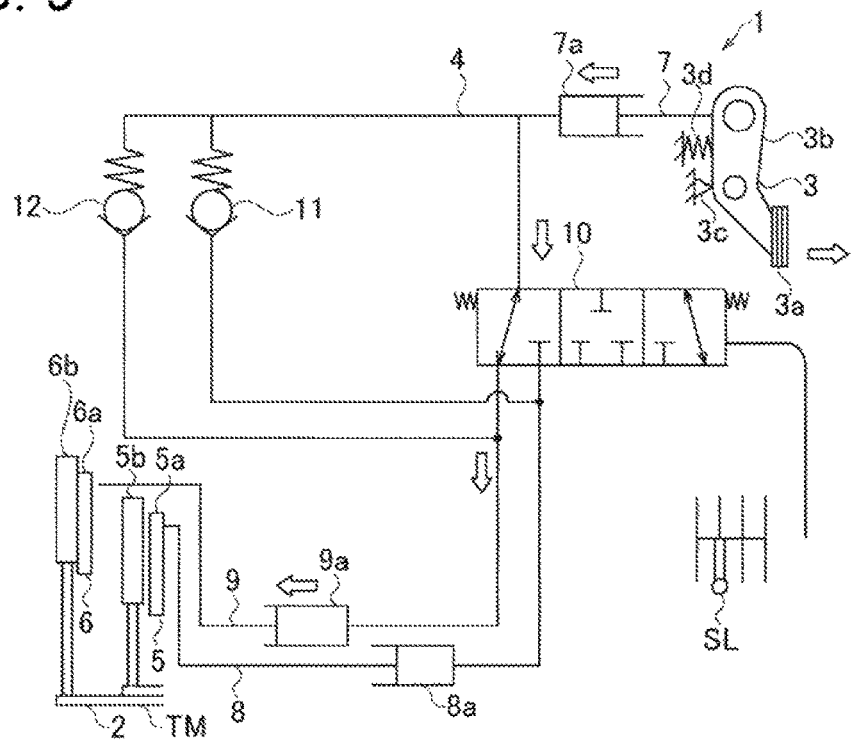
FIG. 9 is a schematic diagram of the first embodiment showing an operation when the second clutch is engaged in response to the clutch pedal being returned in a state that the shift lever is kept tilted rearwards.

As shown in FIG. 9, when the clutch pedal 3a is returned in a state that the shift lever SL is kept tilted rearwards, the restoring action of the clutch pedal 3a actuates the hydraulic cylinder 7a to pressurize the pedal-side hydraulic circuit 7. This forms a flow from the clutch pedal mechanism 3 to the switching valve 10. Then, a movement of the hydraulic cylinder 7a actuates the hydraulic cylinder 9a to pressurize the second clutch-side hydraulic circuit 9. This forms a flow from the switching valve 10 to the second clutch 6. In addition, the pushing action of the hydraulic cylinder 9a engages the second clutch 6. In this case, the first clutch-side hydraulic circuit 8 is not pressurized and the first clutch 5 is kept disengaged due to functioning the switching valve 10 and the check valve 11.

Figure 10:
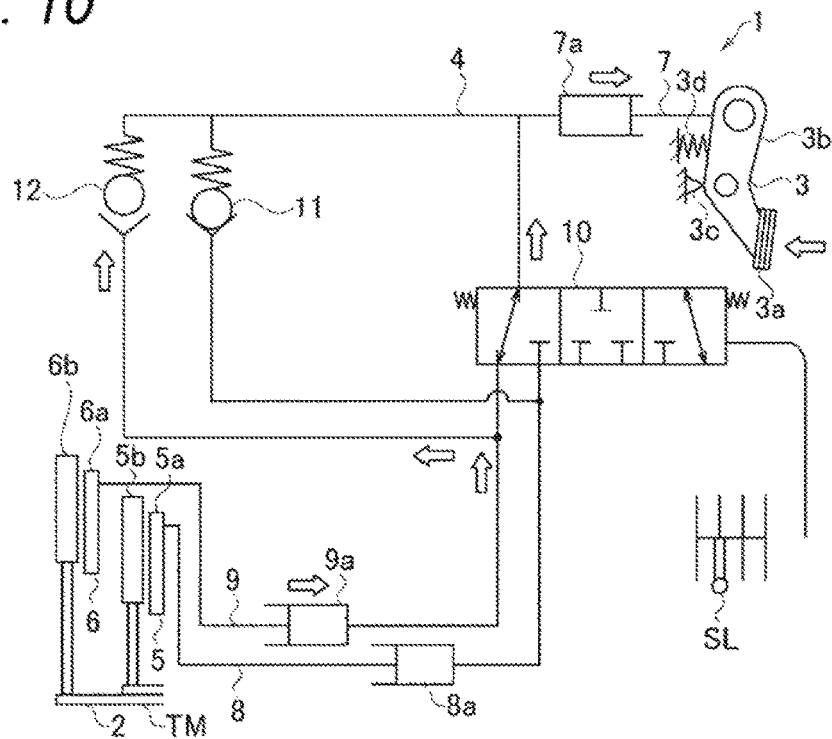
FIG. 10 is a schematic diagram of the first embodiment showing an operation when the clutch pedal is depressed in a state that the second clutch is kept engaged.

As shown in FIG. 10, when the clutch pedal 3a is depressed in a state that the second clutch 6 is kept engaged, the depressing action of the clutch pedal 3a actuates the hydraulic cylinder 7a to depressurize the pedal-side hydraulic circuit 7. This forms flows from the switching valve 10 and the check valve 12 to the clutch pedal mechanism 3. Then, a movement of the hydraulic cylinder 7a actuates the hydraulic cylinder 9a to depressurize the second clutch-side hydraulic circuit 9. This forms flows from the second clutch 6 to the switching valve 10 and the check valve 12. In addition, the pulling action of the hydraulic cylinder 9a disengages the second clutch 6. In this case, the first clutch-side hydraulic circuit 8 is not pressurized and the first clutch 5 is kept disengaged due to the pedal-side hydraulic circuit 7 being depressurized.

Figure 11:
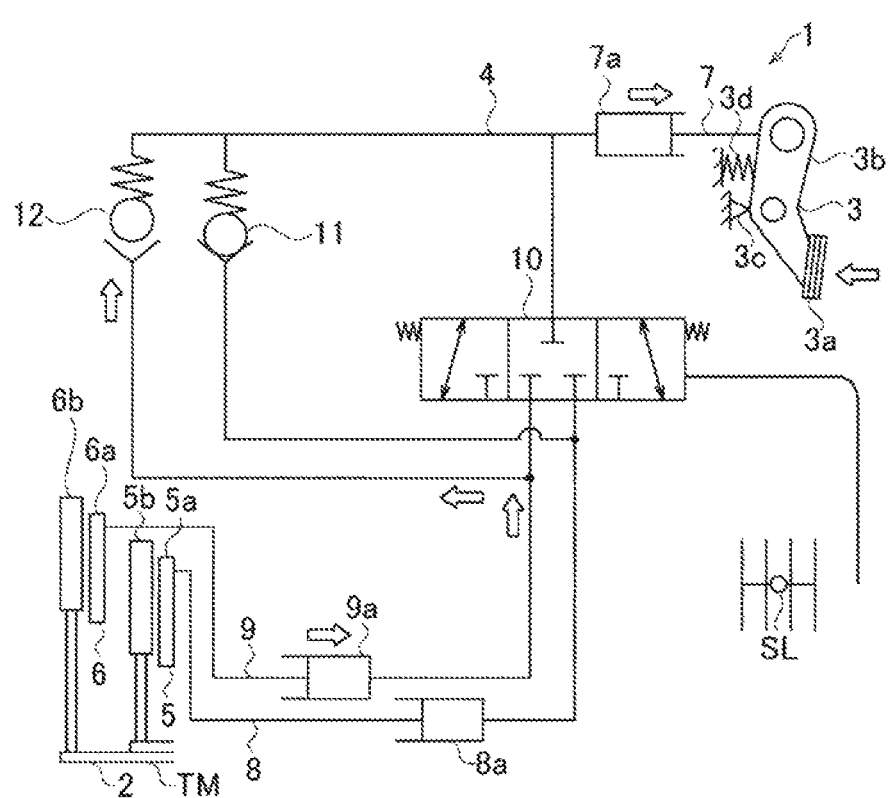
FIG. 11 is a schematic diagram of the first embodiment showing an operation when the clutch pedal is depressed in a state that the shift lever is in the neutral position and the second clutch is kept engaged.

Alternatively, as shown in FIG. 11, when the shift lever SL is returned to the neutral state, the switching valve 10 cuts off the communication between the pedal-side hydraulic circuit 7 and the second clutch-side hydraulic circuit 9 while keeping the pedal-side hydraulic circuit 7 and the first clutch-side hydraulic circuit 8 disconnected. Thereafter, when the clutch pedal 3a is depressed in a state that the second clutch 6 is kept engaged, the depressing action of the clutch pedal 3a actuates the hydraulic cylinder 7a to depressurize the pedal-side hydraulic circuit 7. This forms a flow from the check valve 12 to the clutch pedal mechanism 3. Then, a movement of the hydraulic cylinder 7a actuates the hydraulic cylinder 9a to depressurize the second clutch-side hydraulic circuit 9. This forms a flow from the second clutch 6 to the check valve 12. In addition, the pulling action of the hydraulic cylinder 9a disengages the second clutch 6. In this case, the first clutch-side hydraulic circuit 8 is not pressurized and the first clutch 5 is kept disengaged due to the pedal-side hydraulic circuit 7 being depressurized.

According to this embodiment, when the shift lever SL is tilted forwards, the switching valve 10 connects the first clutch-side hydraulic circuit 8 to the pedal-side hydraulic circuit 7. In this case, the restoring action of the depressed clutch pedal 3a is transmitted to the first clutch 5 by way of the pedal-side hydraulic circuit 7 and the first clutch-side hydraulic circuit 8. Thus, the first clutch 5 is engaged.

On the other hand, when the shift lever SL is tilted rearwards, the switching valve 10 connects the second clutch-side hydraulic circuit 9 to the pedal-side hydraulic circuit 7. In this case, the restoring action of the depressed clutch pedal 3a is transmitted to the second clutch 6 by way of the pedal-side hydraulic circuit 7 and the second clutch-side hydraulic circuit 9. Thus, the second clutch 6 is engaged.

In this way, the clutches are selected in response to whether forwards or rearwards the shift lever SL being tilted. Consequently, similarly in case of the single clutch, the clutches to be engaged or disengaged can be switched by operating the clutch pedal 3a and the shift lever SL without requiring a special operation to switch the clutches to be engaged or disengaged.

The splitter mechanism 41 (refer to FIG. 1) is a mechanism provided to switch high/low between a changing step of gears of the main transmission mechanism 20, and the clutches to be selected can be determined whether forwards or rearwards the shift lever SL being tilted as described above. Thus, the splitter mechanism functions properly in response to the switching of the clutches described above.

Next, a second embodiment of the present invention will be described in detail by reference to the drawings. A clutch connection/disconnection device 21 according to the second embodiment is such that the clutch connection/disconnection device 1 according to the first embodiment is modified and link mechanisms 33, 34 are added. Then, the description of like configurations of the first embodiment will be omitted.

Figure 12:
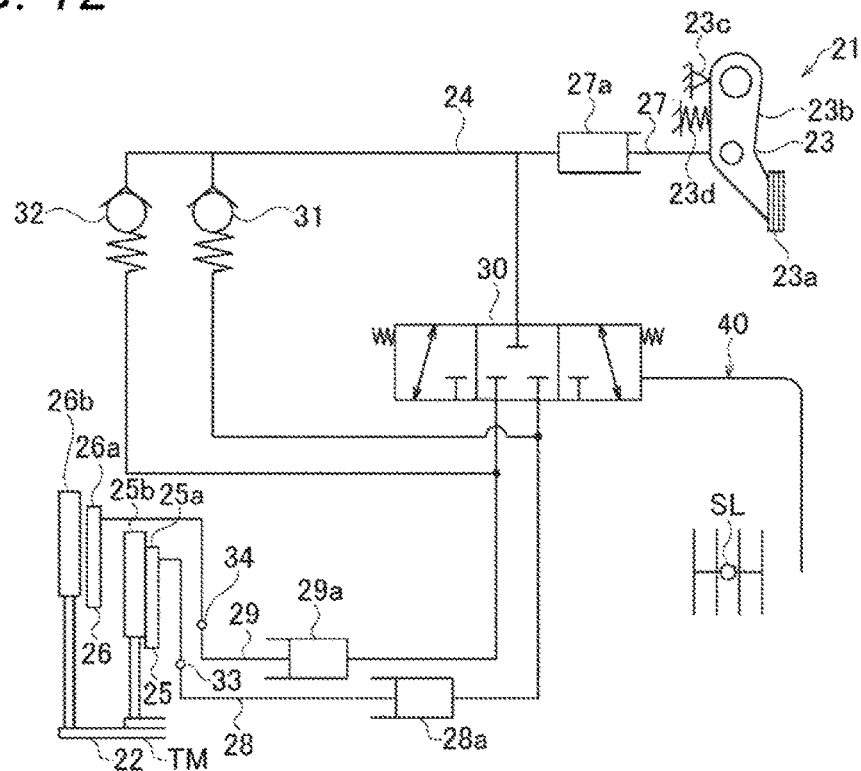
FIG. 12 is a schematic diagram showing a clutch connection/disconnection device according to a second embodiment of the present invention.

The clutch connection/disconnection device 21 shown in FIG. 12 includes a dual clutch 22, a clutch pedal mechanism 23, a hydraulic circuit 24 and the link mechanisms 33, 34.

The dual clutch 22 includes a first clutch 25 and a second clutch 26.

The first clutch 25 includes a first pressure plate 25a and a first clutch disc 25b. The first clutch 25 is coupled to the hydraulic circuit 24 by way of the link mechanism 33, and the first pressure plate 25a is pushed to move towards the first clutch disc 25b and is pressed to contact with the first clutch disc 25b. This allows power of an engine to be transmitted to a first input shaft (whose illustration is omitted). In addition, the first clutch 25 is coupled to the hydraulic circuit 24 by way of the link mechanism 33, and the first pressure plate 25a is pulled to move away from the first clutch disc 25b and is disengaged from the first clutch disc 25b.

The second clutch 26 includes a second pressure plate 26a and a second clutch disc 26b. The second clutch 26 is coupled to the hydraulic circuit 24 by way of the link mechanism 34, and the second pressure plate 26a is pushed to move towards the second clutch disc 26b and is pressed to contact with the second clutch disc 26b. This allows the power of the engine to be transmitted to a second input shaft (whose illustration is omitted). In addition, the second clutch 26 is coupled to the hydraulic circuit 24 by way of the link mechanism 34, and the second pressure plate 26a is pulled to move away from the second clutch disc 26b and is disengaged from the second clutch disc 26b.

The clutch pedal mechanism 23 includes a clutch pedal 23a, an arm 23b, an arm support portion 23c and a spring (a biasing device) 23d.

The arm 23b is inclined in one direction (in a clockwise direction in FIG. 13) while shrinking the spring 23d in response to the clutch pedal 23a being depressed from a predetermined initial position. In addition, the arm 23b is inclined in the other direction (in a counterclockwise direction in Figure), by biasing force produced when the shrunk spring 23d restores (stretches) in response to the depression of the clutch pedal 3a being released, to bring the clutch pedal 23a back to its original position. Namely, the spring 23d biases the clutch pedal 23a to its initial position and returns the clutch pedal 23a to its initial position when the depression is released.

The hydraulic circuit 24 includes a pedal-side hydraulic circuit (a pedal-side transmission circuit) 27, a first clutch-side hydraulic circuit (a first clutch-side transmission circuit) 28, a second clutch-side hydraulic circuit (a second clutch-side transmission circuit) 29, a switching valve (a switching device) 30 and check valves 31, 32.

A path of the pedal-side hydraulic circuit 27 is divided into three paths and the three paths are connected to a switching valve 30 and the check valves 31, 32 respectively. This pedal-side hydraulic circuit 27 includes a hydraulic cylinder 27a which is provided on the path before it is divided into the three paths. The hydraulic cylinder 27a is pushed by the depressed action of the clutch pedal 23a and forms flows from the clutch pedal 23 towards the switching valve 30 and the check valves 31, 32. On the other hand, the hydraulic cylinder 27a is pulled by the restoring action (returning action) of the depressed clutch pedal 23 to form a flow from the switching valve 30 towards the clutch pedal mechanism 23.

Figure 13:
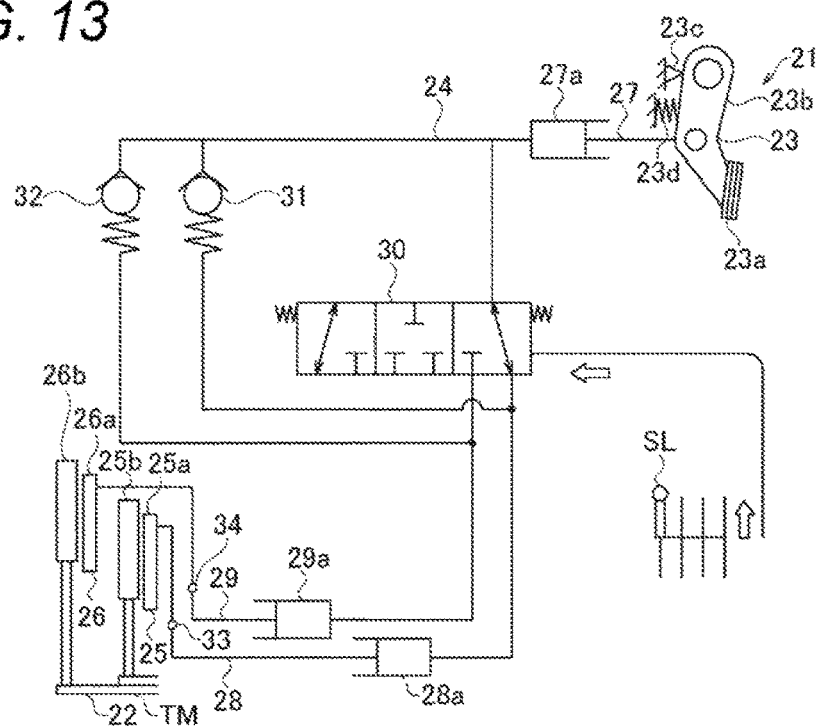
FIG. 13 is a schematic diagram of the second embodiment showing an operation when a shift lever is tilted forwards in a state that a clutch pedal is kept depressed.

The switching valve 30 connects the first clutch-side hydraulic circuit 28 to the pedal-side hydraulic circuit 27 when the shift lever SL is tilted forwards to move the switching valve itself forwards (move leftwards in Figure) (refer to FIG. 13). In addition, the switching valve 30 connects the second clutch-side hydraulic circuit 29 to the pedal-side hydraulic circuit 27 when the shift lever SL is tilted rearwards to move the switching valve itself rearwards (move rightwards in Figure) (refer to FIG. 17).

The check valve 31 is connected to both the pedal-side hydraulic circuit 27 and the first clutch-side hydraulic circuit 28 respectively. This check valve 31 permits a flow from the first clutch-side hydraulic circuit 28 to the pedal-side hydraulic circuit 27 but prohibits a flow from the pedal-side hydraulic circuit 27 to the first clutch-side hydraulic circuit 28.

The check valve 32 is connected to both the pedal-side hydraulic circuit 27 and the second clutch-side hydraulic circuit 29 respectively. This check valve 32 permits a flow from the second clutch-side hydraulic circuit 29 to the pedal-side hydraulic circuit 27 but prohibits a flow from the pedal-side hydraulic circuit 27 to the second clutch-side hydraulic circuit 29.

The link mechanism 33 is provided between the first clutch-side hydraulic circuit 28 and the first clutch 25. This link mechanism 33 converts pushing force to pulling force of the first clutch-side hydraulic circuit 28 to transmit the pulling force to the first clutch 25. In addition, the link mechanism 33 converts pulling force to pushing force of the first clutch-side hydraulic circuit 28 to transmit the pushing force to the first clutch 25.

The link mechanism 34 is provided between the second clutch-side hydraulic circuit 29 and the second clutch 26. This link mechanism 34 converts pushing force to pulling force of the second clutch-side hydraulic circuit 29 to transmit the pulling force to the second clutch 26. In addition, the link mechanism 34 converts pulling force to pushing force of the second clutch-side hydraulic circuit 29 to transmit the pushing force to the second clutch 26.

Next, the operation of the clutch connection/disconnection device 21 will be described.

As shown in FIG. 13, when the shift lever SL is tilted forwards in a state that the clutch pedal 23a is kept depressed, the switching valve 30 moves forwards (moves leftwards in Figure) to connect the first clutch-side hydraulic circuit 28 to the pedal-side hydraulic circuit 27.

Figure 14:
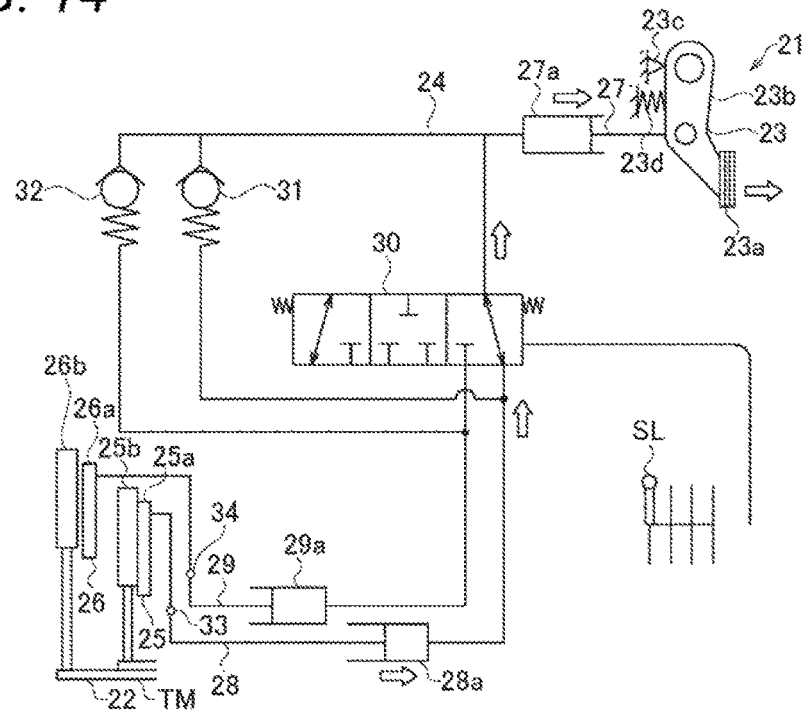
FIG. 14 is a schematic diagram of the second embodiment showing an operation when a first clutch is engaged in response to the clutch pedal being returned in a state that the shift lever is kept tilted forwards.

As shown in FIG. 14, when the clutch pedal 23 is returned in a state that the shift lever SL is kept tilted forwards, the restoring action of the clutch pedal 23a actuates the hydraulic cylinder 27a to depressurize the pedal-side hydraulic circuit 27. This forms a flow from the switching valve 30 to the clutch pedal mechanism 23. Then, a movement of the hydraulic cylinder 27a actuates a hydraulic cylinder 28a to depressurize the first clutch-side hydraulic circuit 28. This forms a flow from the first clutch 25 to the switching valve 30. In addition, a pulling action of the hydraulic cylinder 28a is converted to a pushing action by the link mechanism 33 to engage the first clutch 25. In this case, the second clutch-side hydraulic circuit 29 is not pressurized and the second clutch 26 is kept disengaged due to functioning the switching valve 30 and the check valve 32.

Figure 15:
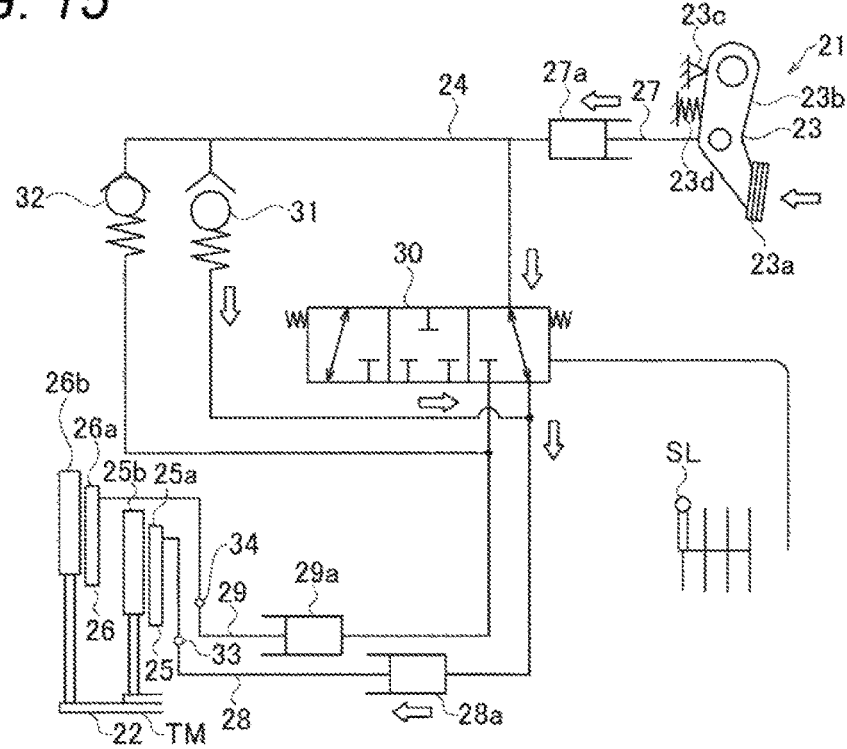
FIG. 15 is a schematic diagram of the second embodiment showing an operation when the clutch pedal is depressed in a state that the first clutch is kept engaged.

As shown in FIG. 15, when the clutch pedal 23 is depressed in a state that the first clutch 25 is kept engaged, the depressing action of the clutch pedal 23a actuates the hydraulic cylinder 27a to pressurize the pedal-side hydraulic circuit 27. This forms flows from the clutch pedal mechanism 23 to the switching valve 30 and the check valve 31. Then, a movement of the hydraulic cylinder 27a actuates the hydraulic cylinder 28a to pressurize the first clutch-side hydraulic circuit 28. This forms flows from the switching valve 30 and the check valve 31 to the first clutch 25. In addition, a pushing action of the hydraulic cylinder 28a is converted to a pulling action by the link mechanism 33 to disengage the first clutch 25. In this case, the second clutch-side hydraulic circuit 29 is not depressurized and the second clutch 26 is kept disengaged due to the pedal-side hydraulic circuit 27 being pressurized.

Figure 16:
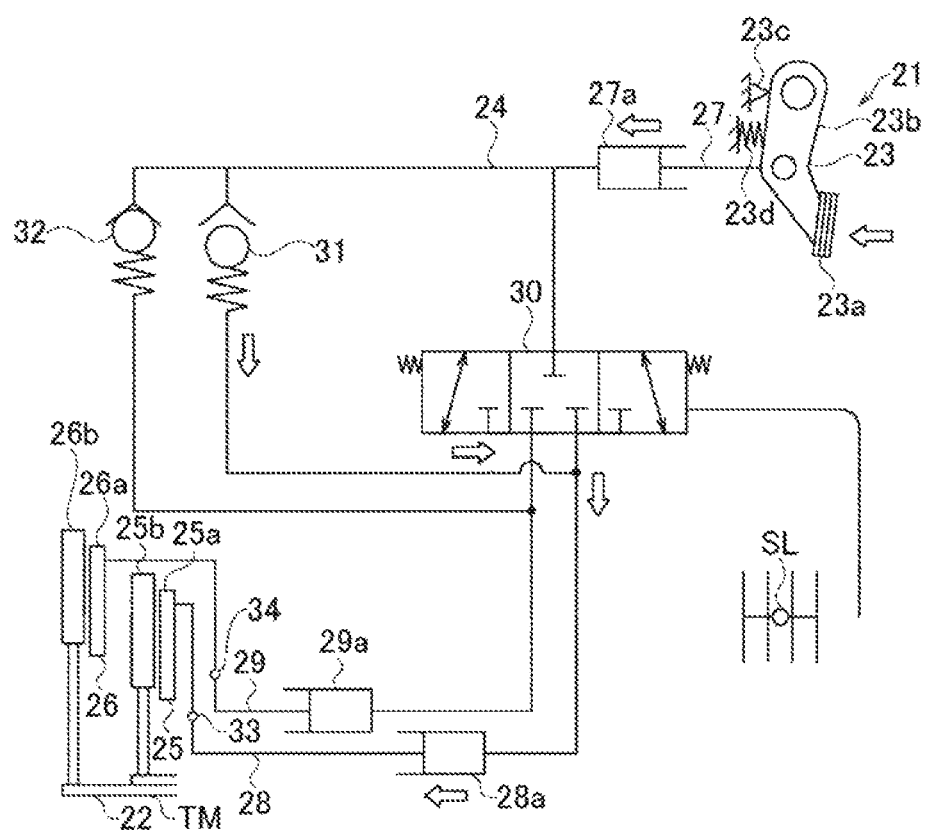
FIG. 16 is a schematic diagram of the second embodiment showing an operation when the clutch pedal is depressed in a state that the shift lever is in a neutral position and the first clutch is kept engaged.

Alternatively, as shown in FIG. 16, when the shift lever SL is returned to a neutral state, the switching valve 30 cuts off the communication between the pedal-side hydraulic circuit 27 and the first clutch-side hydraulic circuit 28 while keeping the pedal-side hydraulic circuit 27 and the second clutch-side hydraulic circuit 29 disconnected. Thereafter, when the clutch pedal 23a is depressed in a state that the first clutch 25 is kept engaged, the depressing action of the clutch pedal 23a actuates the hydraulic cylinder 27a to pressurize the pedal-side hydraulic circuit 27. This forms a flow from the clutch pedal mechanism 23 to the check valve 31. Then, a movement of the hydraulic cylinder 27a actuates a hydraulic cylinder 28a to pressurize the first clutch-side hydraulic circuit 28. This forms a flow from the check valve 31 to the first clutch 25. In addition, a pushing action of the hydraulic cylinder 28a is converted to a pulling action by the link mechanism 33 to disengage the first clutch 25. In this case, the second clutch-side hydraulic circuit 29 is not depressurized and the second clutch 6 is kept disengaged due to the pedal-side hydraulic circuit 27 being pressurized.

Figure 17:
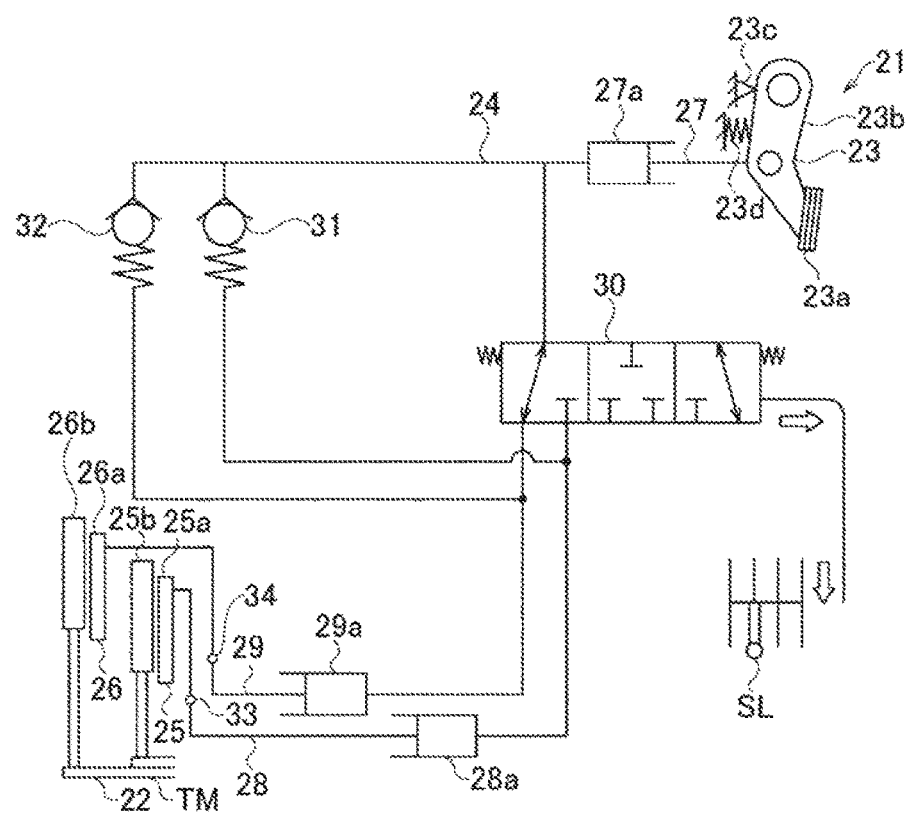
FIG. 17 is a schematic diagram of the second embodiment showing an operation when the shift lever is tilted rearwards in a state that the clutch pedal is kept depressed.

As shown in FIG. 17, when the shift lever SL is tilted rearwards in a state that the clutch pedal 23a is kept depressed, the switching valve 30 moves rearwards (moves rightwards in Figure) to connect the second clutch-side hydraulic circuit 29 to the pedal-side hydraulic circuit 27.

Figure 18:
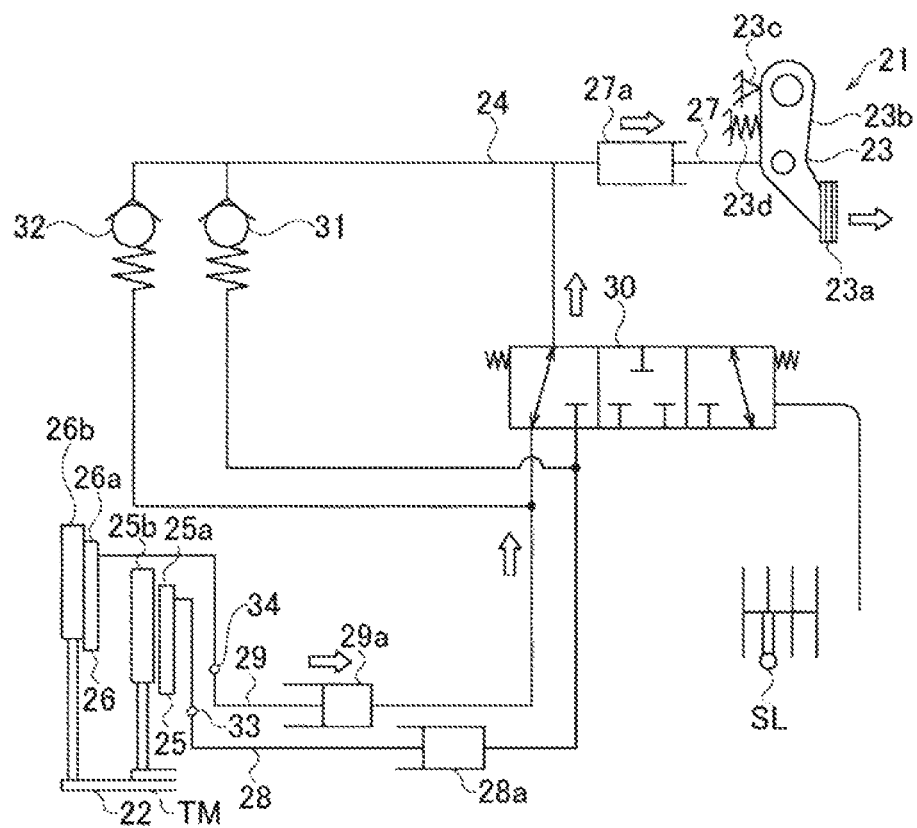
FIG. 18 is a schematic diagram of the second embodiment showing an operation when a second clutch is engaged in response to the clutch pedal being returned in a state that the shift lever is kept tilted rearwards.

As shown in FIG. 18, when the clutch pedal 23a is returned in a state that the shift lever SL is kept tilted rearwards, the restoring action of the clutch pedal 23a actuates the hydraulic cylinder 27a to depressurize the pedal-side hydraulic circuit 27. This forms a flow from the switching valve 30 to the clutch pedal mechanism 23. Then, a movement of the hydraulic cylinder 27a actuates the hydraulic cylinder 29a to depressurize the second clutch-side hydraulic circuit 29. This forms a flow from the second clutch 26 to the switching valve 30. In addition, a pulling action of a hydraulic cylinder 29a is converted to a pushing action by the link mechanism 34 to engage the second clutch 26. In this case, the first clutch-side hydraulic circuit 28 is not depressurized and the first clutch 25 is kept disengaged due to functioning the switching valve 30 and the check valve 31.

Figure 19:
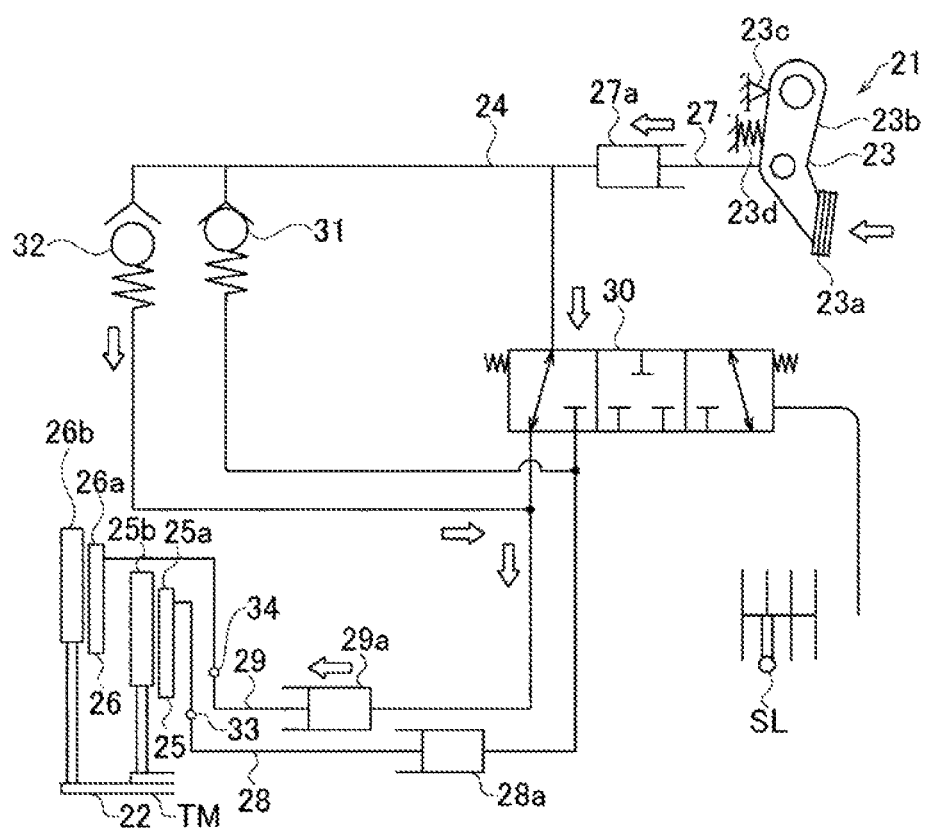
FIG. 19 is a schematic diagram of the second embodiment showing an operation when the clutch pedal is depressed in a state that the second clutch is kept engaged.

As shown in FIG. 19, when the clutch pedal 23a is depressed in a state that the second clutch 26 is kept engaged, the depressing action of the clutch pedal 23a actuates the hydraulic cylinder 27a to pressurize the pedal-side hydraulic circuit 27. This forms flows from the clutch pedal mechanism 23 to the switching valve 30 and the check valve 32. Then, a movement of the hydraulic cylinder 27a actuates the hydraulic cylinder 29a to pressurize the second clutch-side hydraulic circuit 29. This forms flows from the switching valve 30 and the check valve 32 to the second clutch 26. In addition, a pushing action of the hydraulic cylinder 29a is converted to a pulling action by the link mechanism 34 to disengage the second clutch 26. In this case, the first clutch-side hydraulic circuit 28 is not depressurized and the first clutch 5 is kept disengaged due to the pedal-side hydraulic circuit 27 being pressurized.

Figure 20:
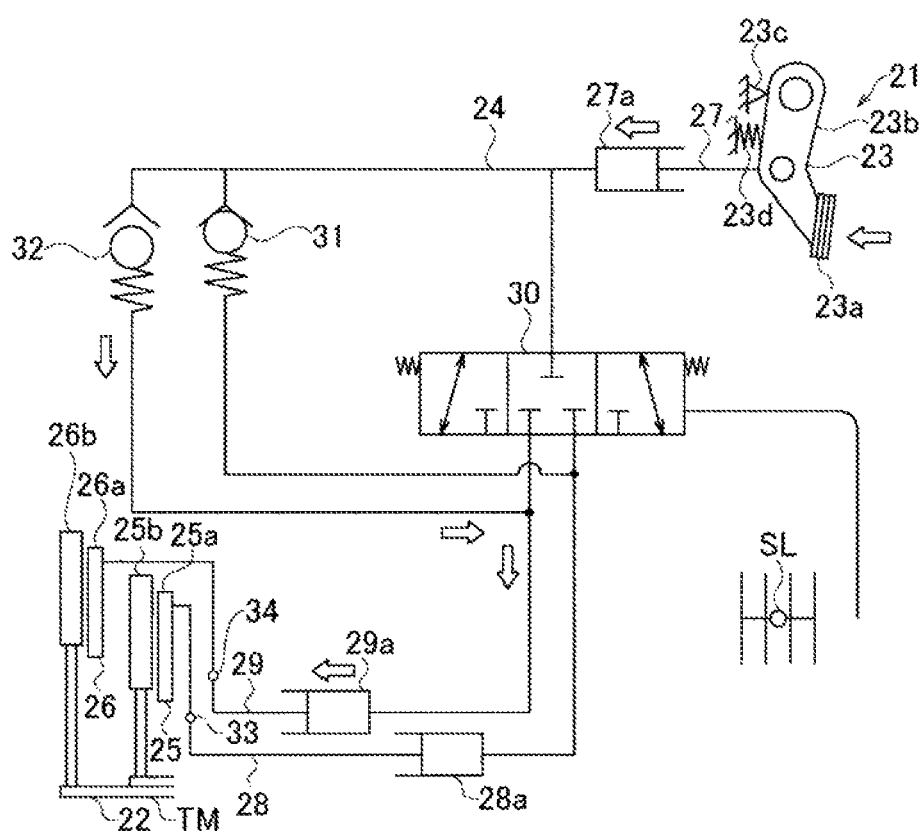
FIG. 20 is a schematic diagram of the second embodiment showing an operation when the clutch pedal is depressed in a state that the shift lever is in the neutral position and the second clutch is kept engaged.

Alternatively, as shown in FIG. 20, when the shift lever SL is returned to the neutral state, the switching valve 30 cuts off the communication between the pedal-side hydraulic circuit 27 and the second clutch-side hydraulic circuit 29 while keeping the pedal-side hydraulic circuit 27 and the first clutch-side hydraulic circuit 28 disconnected. Thereafter, when the clutch pedal 23a is depressed in a state that the second clutch 26 is kept engaged, the depressing action of the clutch pedal 23a actuates the hydraulic cylinder 27a to pressurize the pedal-side hydraulic circuit 27. This forms a flow from the clutch pedal mechanism 23 to the check valve 32. Then, a movement of the hydraulic cylinder 27a actuates the hydraulic cylinder 29a to pressurize the second clutch-side hydraulic circuit 29. This forms a flow from the check valve 32 to the second clutch 26. In addition, a pushing action of the hydraulic cylinder 29a is converted to a pulling action by the link mechanism 34 to disengage the second clutch 26. In this case, the first clutch-side hydraulic circuit 28 is not pressurized and the first clutch 25 is kept disengaged due to the pedal-side hydraulic circuit 27 being pressurized.

According to this embodiment, similarly to the first embodiment, the clutches are selected in response to whether forwards or rearwards the shift lever SL being tilted.

Thus, while the embodiments to which the invention made by the inventor is applied have been described heretofore, the invention is not limited at all by the description and the drawings which make up part of the disclosure of the invention based on the embodiments. Namely, other embodiments, examples and operating techniques which are made based on the embodiments described herein by those skilled in the art to which the invention pertains should all, of course, be included in the scope of the invention.

The invention claimed is:
1. A clutch connection/disconnection device connected to an input side of a main transmission mechanism having a high-gear side path and a low-gear side path being switchable as a power transmission path, the clutch connection/disconnection device comprising:
   a dual clutch including a first clutch and a second clutch;

a shift lever configured to move on a shifting path including a high-gear side shift position at one side and a low-gear side shift position at the other side, wherein the shift lever configured to move to the high-gear side shift position and the low-gear side shift position;

a clutch pedal configured to be depressed to move from a predetermined initial position;

a biasing device configured to bias the clutch pedal to return the clutch pedal to the initial position in response to releasing a depression of the clutch pedal;

a pedal-side transmission circuit for transmitting, from the clutch pedal, a restoring action in which the clutch pedal being depressed is returned to the initial position by the biasing device;

a first clutch-side transmission circuit for transmitting the restoring action to the first clutch;

a second clutch-side transmission circuit for transmitting the restoring action to the second clutch; and a switching device configured to connect the first clutch-side transmission circuit to the pedal-side transmission circuit when the shift lever is moved to the high-gear side shift position and to connect the second clutch-side transmission circuit to the pedal-side transmission circuit when the shift lever is moved to the low-gear side shift position, and wherein the first clutch is engaged to switch the power transmission path to the high-gear side path in response to the restoring action being transmitted from the first clutch-side transmission circuit, and wherein the second clutch is engaged to switch the power transmission path to the low-gear side path in response to the restoring action being transmitted from the second clutch-side transmission circuit.

* * * * *